July 10, 1962     H. HOFFMANN, JR     3,043,911
TELE-MAP SEMI-AUTOMATIC ENCODER
Filed April 25, 1961     6 Sheets-Sheet 1

July 10, 1962 H. HOFFMANN, JR 3,043,911
TELE-MAP SEMI-AUTOMATIC ENCODER
Filed April 25, 1961 6 Sheets-Sheet 2

INVENTOR.
HENRY HOFFMANN Jr.
BY
Willard R. Matthews Jr
ATTORNEYS

United States Patent Office 3,043,911
Patented July 10, 1962

---

3,043,911
TELE-MAP SEMI-AUTOMATIC ENCODER
Henry Hoffmann, Jr., Rome, N.Y., assignor to the United States of America as represented by the Secretary of the Air Force
Filed Apr. 25, 1961, Ser. No. 105,521
5 Claims. (Cl. 178—17)
(Granted under Title 35, U.S. Code (1952), sec. 266)

The invention described herein may be manufactured and used by or for the United States Government for governmental purposes without payment to me of any royalty thereon.

This invention relates generally to a system for transmitting line drawing data, such as map information, over standard teletypewriter communication facilities, and more particularly refers to an improved encoder means especially adapted to translate, semi-automatically, the co-ordinates and symbols of a weather map into Teletype code.

The basic premise of Tele-map operation is that, if the coordinates of a sufficient number of points on a contour of a line drawing are transmitted, the contour may be reconstructed with reasonable accuracy at the receiving station. Statistical observations indicate that the informational content contained in the contours of a standard Air Force weather map for example, is such that the time to transmit the co-ordinate data is short as compared to prior art methods such as conventional facsimile transmission techniques, or reconstruction of the map by sequentially transmitting every co-ordinate on the map by indicating whether or not information exists at that co-ordinate (black or white). Said last mentioned methods comprehend placing the map in a teletypewriter and transmitting a space where no information exists and an x where a line exists. This latter method is, of course, essentially a reduced resolution facsimile system. To transmit, in actual operation, a contour co-ordinate, a "code block" of four Teletype characters are employed. Such Teletype characters comprise:

Letter character (L) for synchronization with the decoding equipment,
Number character (0–5) to indicate the first digit of the co-ordinate,
Number character (0–9) to indicate the second digit of the co-ordinate, and
Identifying character to identify a particular contour.

The two digit co-ordinate number corresponds to the number of Teletype character spaces from the left-hand side of the map to the contour line. For example, if contour A occurs at the twenty-fifth space on a particular line, the resultant "code block" would be L25A.

An improved Tele-map system of this type is illustrated in my co-pending patent application, Serial No. 781,813 filed December 19, 1958, entitled Tele-Map System, now Patent No. 3,021,389, the basic principles of which will be described herein insofar as they are germane to the present invention.

A severe limitation common to all prior art Tele-map systems has been the excessive time required to cut code blocks representing each contour line on the teletypewriter tape. Heretofore this has been performed manually and has been subject to error on the part of the operator.

Accordingly, it is the principal object of this invention to provide a semi-automatic Tele-map encoder especially adapted to enable the operator to encode maps more efficiently and at a much faster rate than has heretofore been possible.

Other objects and advantages of the present invention will be apparent and suggest themselves to those skilled in the art to which the present invention is related from a reading of the following specification and claims in conjunction with the accompanying drawings, in which:

FIG. 4 illustrates the printed circuit T-square comprehended by my invention;

Figure 5:
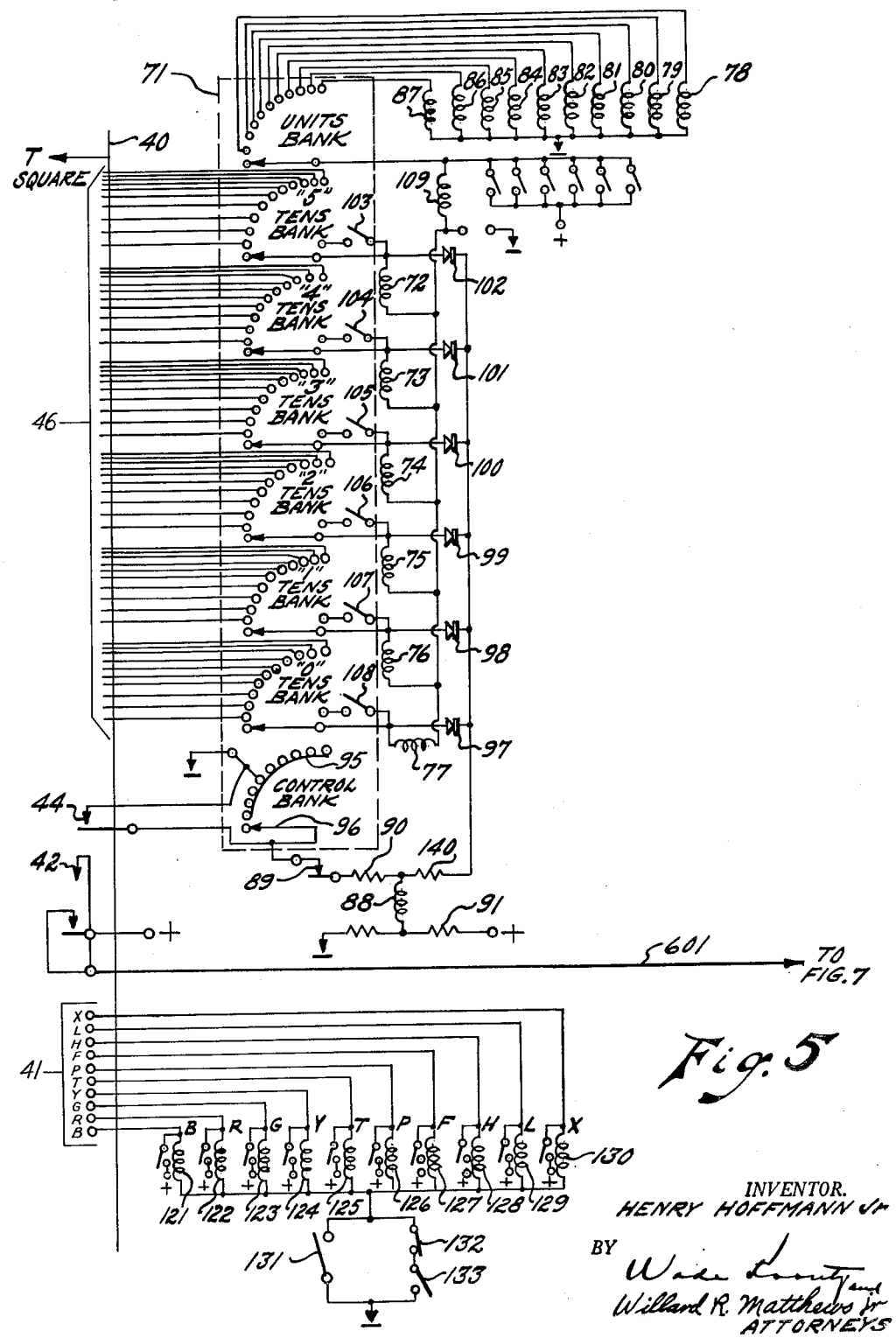
Figure 6:
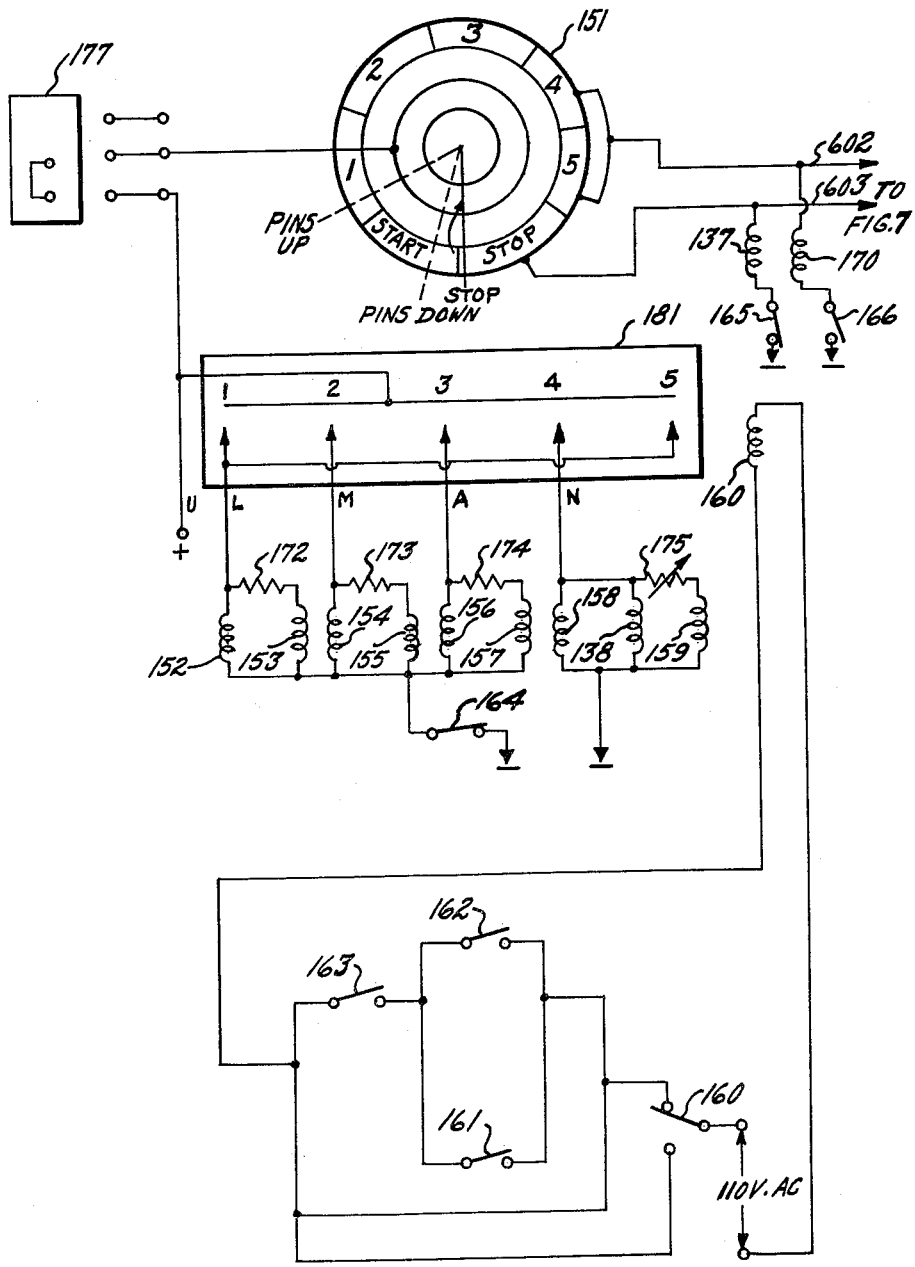
Figure 7:
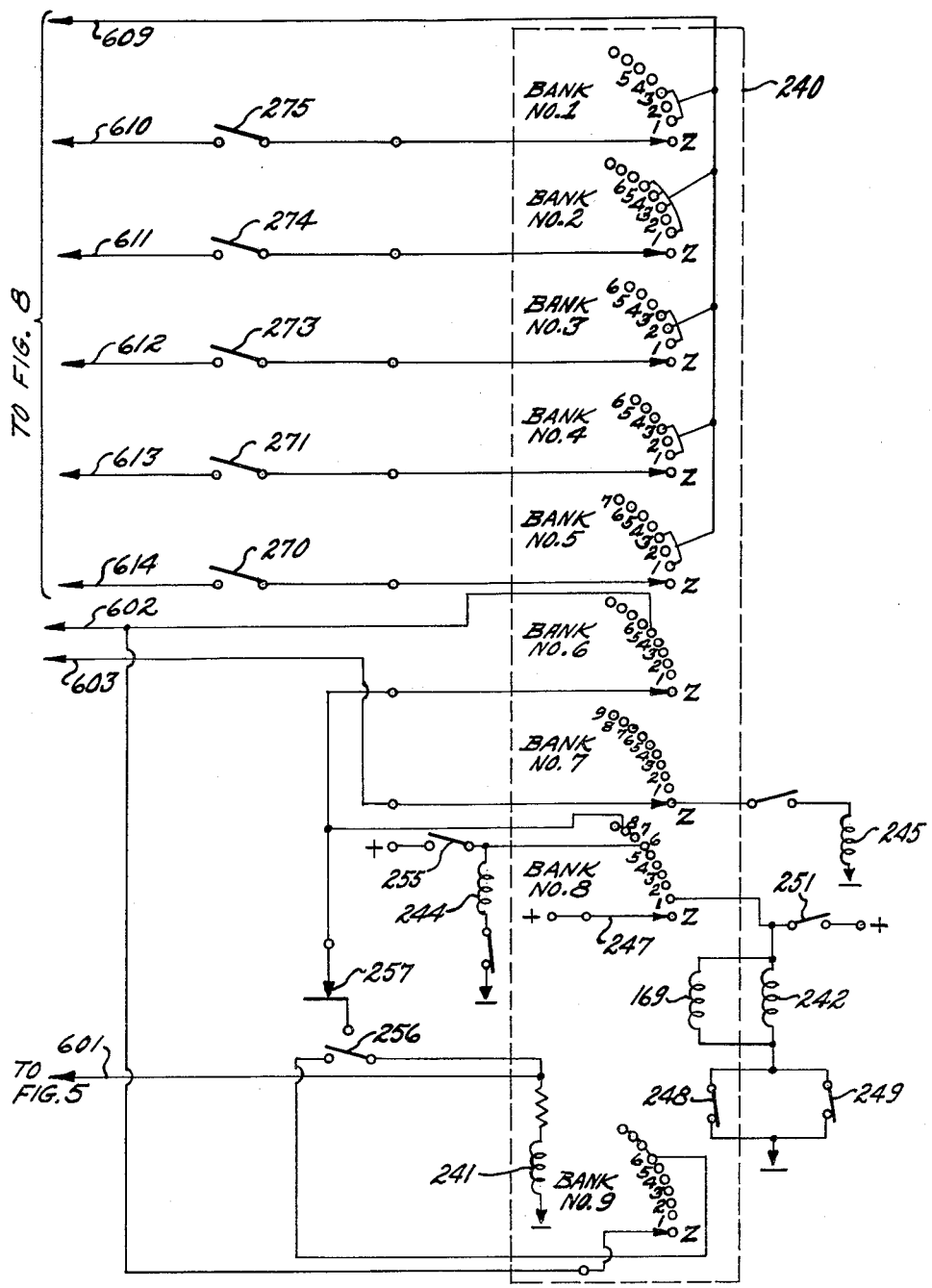
Figure 8:
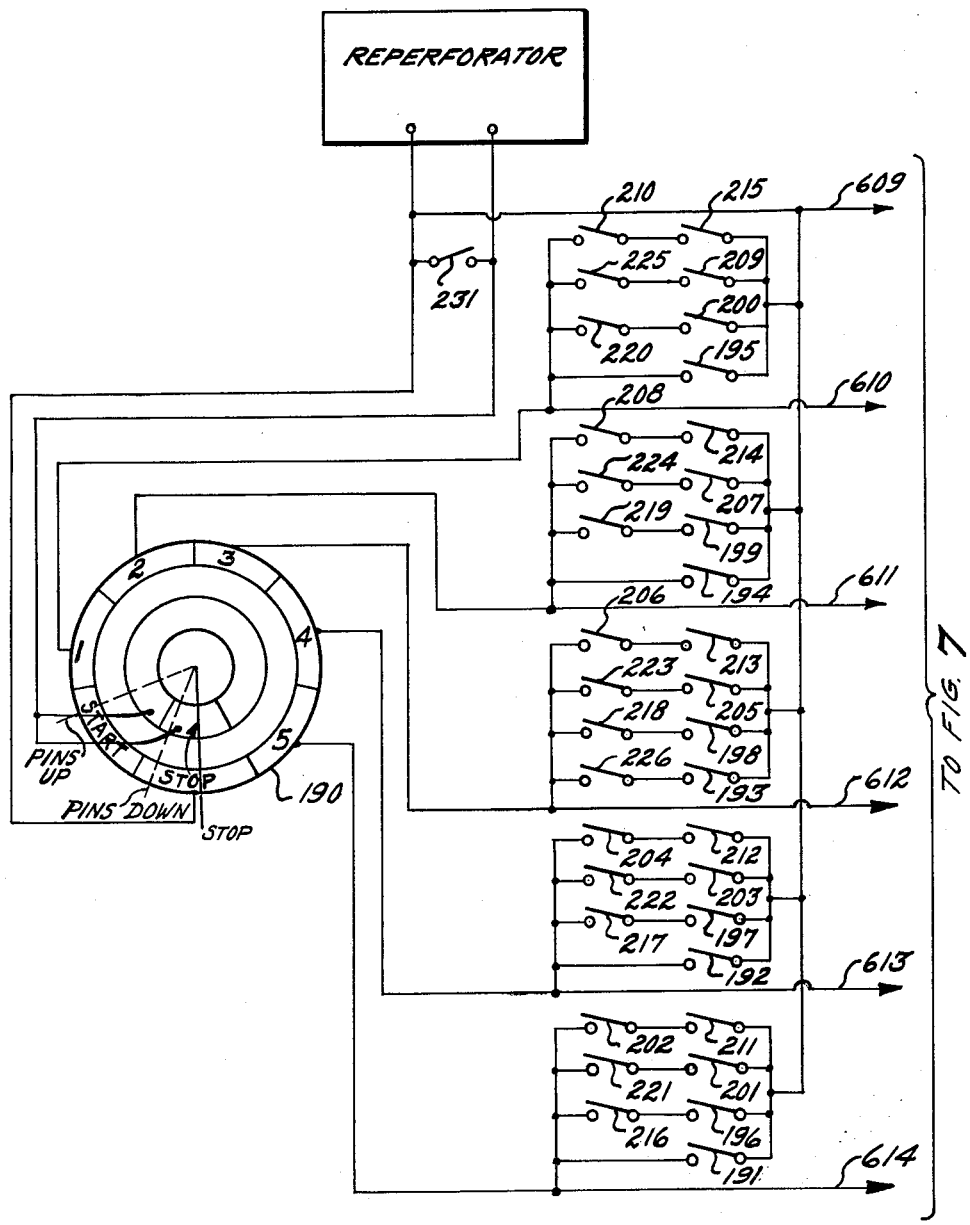

FIG. 5 presents a schematic diagram of co-ordinate storage and color storage stages of my invention;

FIG. 6 presents a schematic diagram of the co-ordinate readout control stage of my invention;

FIG. 7 presents a schematic diagram of the end-of-line control stage of my invention; and FIG. 8 presents a schematic diagram of the co-ordinate readout stage of my invention.

Figure 1:
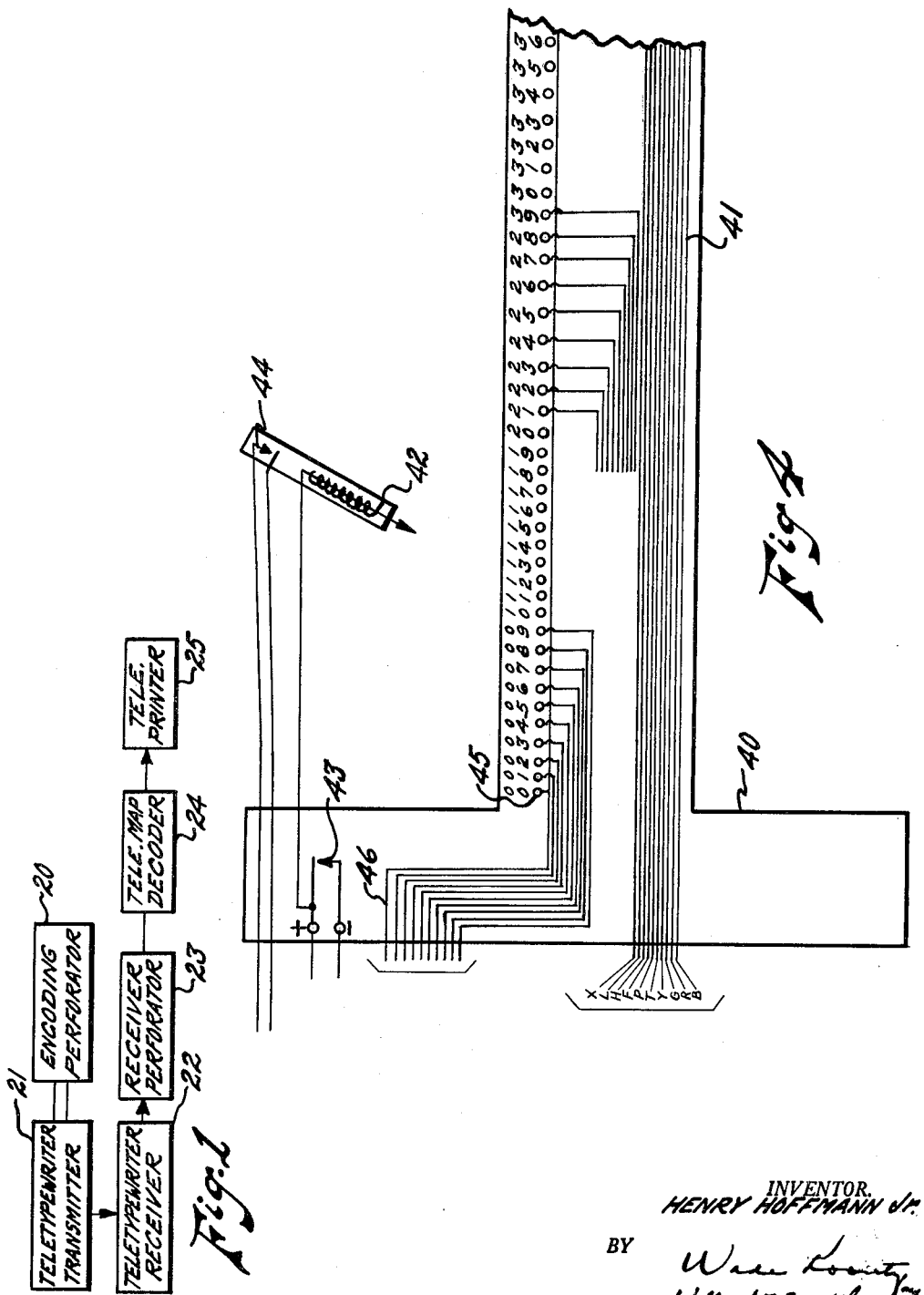
FIG. 1 is a block diagram of a teletypewriter communication system of the type comprehended by my invention.
Figure 2:
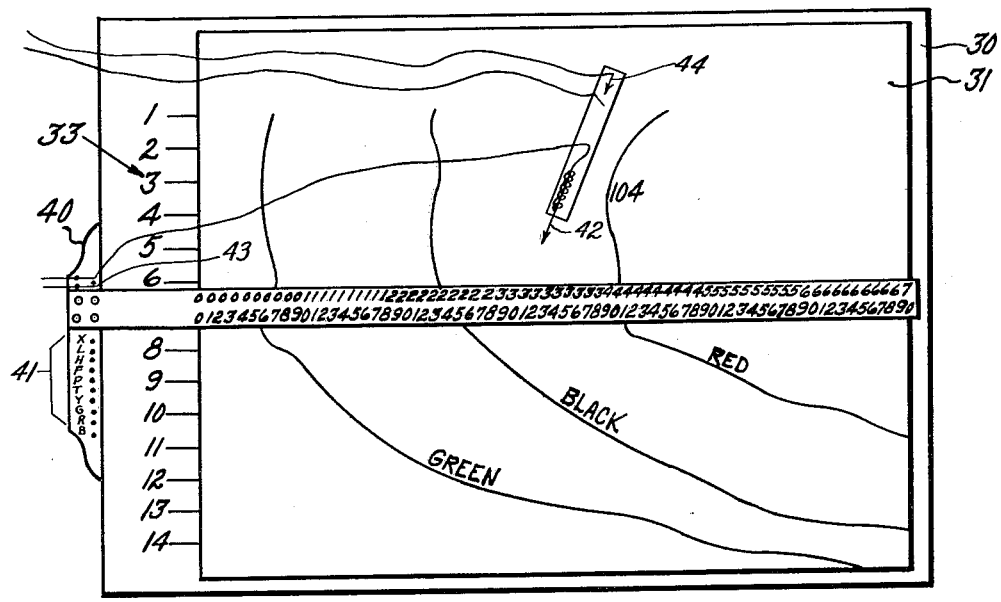
FIG. 2 illustrates the application of the co-ordinate overlay reader to convert map co-ordinate information into teletypewriter code signals.
Figure 3:
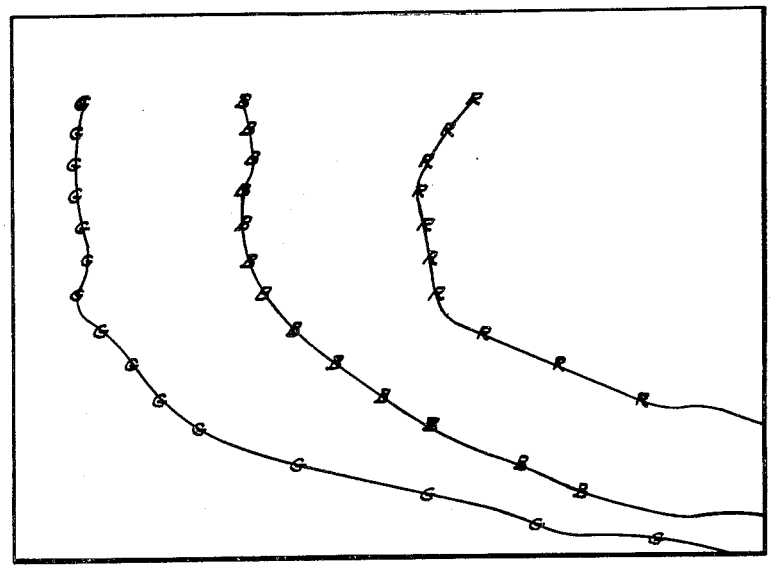
FIG. 3 is an illustration showing how the received teletypewriter information is transferred from the page copy of the teletypewriter to a map overlay to reconstruct the original line drawings.

Referring now to FIGURES 1, 2 and 3, there is illustrated the Tele-map system and mode of operation described in my co-pending application, Serial No. 781,813, filed Dec. 19, 1958. The present invention, by way of illustration, is described with reference thereto, but is not intended to be limited thereby; said invention being construed to include all uses and applications appropriate to the full scope of the appended claims.

Referring more particularly to FIGURE 1, reference numeral 20 refers to an encoding perforator which may be any type of teletypewriter perforator which will cut a standard teletypewriter tape. The information which is cut on the tape by the perforator is taken from the map overlay reader shown in FIGURE 2. The tape from the encoding perforator 20 is fed to a conventional teletypewriter transmitter 21 and the information is then transmitted to receiver 22 in the normal manner. The output of the receiver 22 is applied to a reperforator 23 which cuts a tape identical to that which was cut by the encoding perforator. The tape from the reperforator 23 is then fed into the Tele-map decoder 24 which in turn controls the teleprinter 25 to produce a page copy sheet which is then used to reproduce the original map information on a map overlay. The information from the page copy sheet is transferred to the map overlay in the manner shown in FIGURE 3. The page copy is placed under the map overlay and the like characters are connected together to produce the original line drawing.

Referring again to FIGURE 2, reference numeral 30 refers to the board on which a line drawing 31 is mounted. The board has number reference markings 33 thereon correspond to the normal line spaces of the teletypewriter. The T-square 40 has one edge numerically calibrated to the character spacings of a standard teletypewriter. Each contour position is represented in the transmitted signal sequentially by a code block consisting of four teletypewriter characters. The first character in the code block is the letters-character (L) for synchronization of the decoding equipment. The second character is a number character (0–9) to indicate the first digit of the co-ordinate. The third character is a number character (0–9) to indicate the second digit of the coordinate and the fourth is a line identifying character (A–Z). The number characters correspond to the number of character spaces from the left hand side of the line drawing to the contour line; for example, the code block for the first contour line on reference line 6 for the drawing illustrated is L06G, which means the green line is six spaces from the left hand side of the paper. The code for the whole sixth line is L06G, L24B, L40R, F04, LSFLALA. The code blocks L06G, L24B, and L40R represent the coordinate positions for the green, black and red drawing lines on reference line 6, and the F04 identifies the last line sent which is the red line in this case. The symbols LS are employed to return the teleprinter carriage and reset the decoding mechanism. The symbols FLALA are for advancing the teleprinter two lines. The T-square is advanced from line to line and the code blocks representing each contour line are cut on the teletypewriter tape by perforator 20. The perforator, transmitter, receiver, reperforator and teleprinter are standard teletypewriter equipment.

With reference to the above described Tele-map system, the present invention provides semi-automatic means for encoding said teletypewriter tape. This is accomplished by a novel printed circuit T-square in combination with certain control circuits as hereinafter described.

T-square 40 is illustrated in detail by FIGURE 4. Said T-square 40 is made preferably of a dielectric material, and includes certain printed circuitry. The edge of said T-square contains a series of individual metallic contacts 45 spaced according to the character spacing of a conventional teletypewriter. Parallel metallic strips 41 are disposed longitudinally along the surface of the T-square. Connecting strips 46 are provided to connect metallic contacts 45 to the encoder control circuitry. Also included as an integral part of the T-square assembly is electric probe 42 which, by contact with one of the metallic contacts on the edge of the T-square and one of the parallel contacts, will set up the proper code in the encoder.

In operation, the "end-of-line" button switch 43 on T-square 40 is closed prior to the actual encoding of the map. This code block will reset the decoding equipment at the receiving site. T-square 40 is then aligned with the first vertical mark on the top of drawing board 30. The operator then touches electric probe 42 to the contact corresponding to the first line contour from the left-hand side of T-square 40. The operator then touches the probe to the proper metallic strip 41 (see FIGURE 4) corresponding to the color of the line contour. The code block containing the proper co-ordinating and identifying color symbol will then be read-out of the encoder through a "Read-Out Distributor," to the perforator. The operator then proceeds to the next contour and repeats the operation. This procedure is continued until all the lines have been coded. "End-of-Line" button 43 is then pressed and T-square 40 is advanced to the next vertical mark on the drawing board 29. This procedure is repeated until the left-hand side of the map is coded and then the entire procedure is repeated for the right-hand side of the map.

For special symbols—H, L, and X corresponding to a High, a Low and a Georef co-ordinate respectively, the same procedure is used as in the coding of the contour lines.

Figures operation, which is employed to transmit the value of a particular isobar contour, is as follows:

After coding the co-ordinates of a particular isobar, the pressure of the isobar is observed, for example 21; the twenty-first metallic contact on T-square 40 is touched with probe 42 as is the parallel contact "FIGURE OP." The encoder then reads-out the code "FIGURES 21"— which will be decoded in the receiving equipment and the symbols 21 printed out next to the isobar line.

The perforated tape out of the reperforator may then be entered into any conventional Teletype network and transmitted to the receiving site.

Referring now to FIGURE 5, the basic components of the coordinate storage circuitry are, eight bank stepping switch 71, multi-contact T-square 40, tens relays 72–77 and units relays 78–87. T-square 40 has two blocks of 70 possible co-ordinates to encode the left-hand or right-hand side of the map. The corresponding contacts on the left and right-hand side of T-square 40 are common, i.e., the twenty-first contact on the left is common with the twenty-first contact on the right. These contacts are wired in groups of ten to contacts on the stepping switch.

When probe 42 is pressed onto one of the contacts on the T-square, switch 44 in the probe is closed which closes the circuit for stepping switch coil 88 through interrupter switch 89, 50 ohm resistor 90, the coil, and 150 ohm resistor 91. Activation of coil 88 and the action of interrupter switch 89 permit stepping switch 71 to advance off the "z" position. Stepping switch 71 can now advance continuously by activation through shorted contacts 95 and wiper contact 96 of the control bank. When Stepping Switch 71 has advanced to a position which allows the positive voltage on the probe to be applied to 50 ohm resistor 140 through the contacts on the stepping switch and one of the diodes 97—102, the resistive bridge circuit balances and de-activates Stepping Switch Coil 88, thus stopping the switch from advancing. The positive voltage from the probe will also activate the proper "tens" relay, (72–77), i.e., if the probe was applied to the 48th contact in the T-square, "Tens" relay Number 4 (72) would be activated. The relays have holding contacts 103–108 which will lock up and hold the relay activated after the probe has been removed. The proper "units" relay is now activated through a "tens" relay contact and the "units" bank on Stepping Switch 71 i.e., in the example above, "units" relay "8" (85) would be activated. Units Lock Relay, 109 "UL," is also activated and is used in the "Colors Storage."

The basic components of the "Colors Storage" circuitry are storage relays, 121–130, i.e., six colors (B, R, G, Y, T, P), for the colors Black, Red, Green, Yellow, Tan and Purple), one Figures operation (F) and three special symbols (H, L, and X) for High, Low and Georef. The ten parallel metallic contacts 41 on T-square 40 are wired to the coils of their respective relays. Contacts 131, 132, 133 of relays 109, 137 and 138, respectively, are employed to permit activation and unlocking of the color relays. By making contact with the probe to the desired parallel contact on the T-square, the corresponding relay is activated through contacts 131. The operator must therefore set up the co-ordinate relays before he can activate a colors relay. This is important and will be described in the co-ordinate read-out operation.

The co-ordinate Read-Out operation may best be described by subdividing the operating in two parts; Control Circuitry, and Co-ordinate Read-Out.

The co-ordinate read-out stage of my invention is best understood when considered in conjunction with FIGS. 6 and 8, wherein FIG. 6 illustrates the control circuitry, and FIG. 8 shows the read-out circuitry.

The basic components of the control circuitry are control commutator 151, the tape reading mechanism, a continuous beryllium Teletype tape associated therewith containing the symbols E, Line Feed, Space and Carriage Return adapted to close tape reading switches 1, 2, 3 and 4, respectively, control relays 152–159, clutch coil 360, contacts 160–166 of relays 121–130 and 169, and the reset relays 137 and 170. Also included are 910 ohm resistors 172, 173, 174 and 1000 ohm variable resistor 175. In Operation; initially, the clutch is de-energized and control commutator 151 is in the stop position as shown in FIG. 6, with the continuous tape in the "Carriage Return" position. Switch #4 of tape reader 181 therefore is closed resulting in activation of relays 158, 138 and 159. Activation by the probe of a co-ordinate relay and consequently of the relay 109 permits activation of relays 121–130 (see FIG. 5). When a color relay is activated by the probe, clutch coil 360 is activated through relay 109 and color relay contacts 160–163, permitting control commutator 151 to rotate. At the pins down position, switch #4 of tape reader 181 opens, and relays 158, 138 and 159 are de-activated. At the pins up position, the continuous Teletype tape advances to the E position and switch #1 of the tape reader closes, activating relays 152 and 153. This operation continues activating relays 154, 156 and 158 sequentially as the commutator rotates. During the period when relays 158, 138 and 159 are activated, additional operations occur. As commutator 151 reaches segments 4 and 5, the relay 170 activates, which unlocks relay 109, thereby removing the positive voltage from the resistive bridge network controlling co-ordinate stepping switch coil 88. Stepping switch 71 will now advance to the neutral "z" position and stop. As commutator 151 reaches the stop segment, relay 137 activates which, in turn, de-activates color relays 121–130. Commutator 151 will stop in the stop position as relays 109 and 121–130 have been de-activated. This completes the cycle and the next co-ordinate may be read out.

The basic components of the co-ordinate read-out circuitry are: read-out commutator 190 co-ordinate relay contacts such that any number from 0–5 may be set up by tens relays, and 0–9 by units relays in the standard Teletype code by putting the contacts in series with the five segments on the commutator, and relay contacts 191–226 which permit the code to be read out sequentially. Contacts 191–195 are activated by relay 152, contacts 196–200 by relay 154, contacts 201–210 by relay 156, contacts 211–215 by relay 158, contacts 216–220 by relays 72–77, contacts 221–225 by relays 80–87, and contact 226 by relay 127.

Operation is as follows: During the first complete rotation of commutator 190 contacts 191–195 are closed which permits either the Teletype characters "Letters of Figures" to be commutated to reperforator 230. During the following three rotations of the commutator relay, contacts 196, 200, 201–210 and 211–215 are closed sequentially permitting commutation of the co-ordinates (tens and units) and the color character to the reperforator. This completes the commutation of the basic four character code block.

There remains, then, only the end-of-line operation of my invention to be considered. This may best be described by subdividing it into two parts; the control circuitry and the read-out circuitry, both of which are illustrated in FIGURE 7.

The basic components of the control circuitry are: banks 6–8 and stepping coil 241 of End-of-Line Stepping Switch 240, Control Commutator 190, Clutch Coil 360, relays 242, 169, 244, 245 and 138, and "End-of-Line" Switch 43.

Initially, stepping coil 241 is de-energized and Stepping Switch 240 is in the neutral "z" position. Closing of "End-of-Line" Switch 43 activates stepping coil 241. Opening of the switch de-activates the stepping coil, and the "End-of-Line" stepping switch advances to position #1. Relays 169 and 242 are now activated through wiper 247 and contact 1 of bank #8 and relay contacts 248 and 249 of relays 138 and 244, respectively. Contact 251 is employed to lock up relays 169 and 242. Activation of relay 169 permits clutch coil 360 to be activated causing commutator 190 to rotate. Stepping coil 241 will be activated and de-activated each time the commutator brushes reach commutator segments 4 and 5 through bank #9 on stepping switch 240. This section advances the stepping switch one position for each rotation of the commutator. When the stepping switch advances to position #6, relay 244 is activated through bank #8 on stepping switch 240 and is locked up by contact 255. Contact 256 switches the stepping coil from bank #9 of stepping switch 240 to interruptor switch 257 in series with contact 6 of bank #8 of the stepping switch and the wiper contact to a positive voltage. This permits activation of stepping coil 241 and the switch will advance to position #7. The remaining contacts on bank #8 are shorted which permits the stepping switch to advance until it reaches the neutral position and stops. When relay 244 is activated a set of contacts 231 short out read-out commutator 190 to reperforator 230, thereby preventing read-out after five characters have been read out. When relay 138 is activated for the second time corresponding to eight rotations of the commutator, relay 245 is activated through the "Stop" segment on control commutator 151, the wiper, and the "z" contact of bank #7 of stepping switch 240. This permits de-activation of relays 244, 242 and 169 and clutch 360. This completes the control operation with all components in their initial conditions.

The basic components of end-of-line read-out circuit are: "Readout" commutator 190, banks #1 to 5 of stepping switch 240, and contacts 270–275, and 231. Contact 270 is activated by relay 169, 271–275 by relay 242, and 231 by relay 244.

Banks #1 to 5 correspond to the five digits of the Teletype code, respectively, and positions #1 to 5 of these banks have been wired such that the commutator will read-out the Teletype characters "Letters," Space, Figures and Line advance to reperforator 230. After these five characters have been read out, contacts 231 will short out commutator 190 in order that no additional characters are read out to the reperforator as the commutator continues to rotate. Return of stepping switch 240 to the neutral position completes the operation.

Although the invention has been described with reference to a particular embodiment, it will be understood to those skilled in the art, that the invention is capable of a variety of alternative embodiments within the spirit and scope of the appended claims.

I claim:

1. In a device for transmitting map coordinate information over telemetric communication facilities, apparatus for converting the map co-ordinate information into telemetric code information comprising means for detecting contour co-ordinate information, contour identification means, means for storing said co-ordinate information, means to read-out said stored information, and means for perforating a teletypewriter tape in response thereto.

2. In a system for transmitting map co-ordinate information over telemetric communication facilities, encoding means comprising means for collecting co-ordinate data representing the various contour lines to be transmitted, means for identifying said contour lines, means for grouping said co-ordinate data according to values taken at equal horizontal increments of said map, means for sequentially storing and reading out said data groups, and means for perforating a teletypewriter tape in response to said read-out data groups.

3. A semi-automatic Tele-map encoder comprising a T-square having a plurality of electrical contacts representing contour co-ordinate and identification data disposed on the surface thereof, said T-square being so aligned with respect to the map being encoded as to be movable in equal horizontal increments over the surface thereof, co-ordinate information storage means, a first electrical circuit adapted to place said storage means in a condition compatible with designated contour co-ordinates, a second electrical circuit adapted to energize contour identifying relays, an electrical probe for use in conjunction with said T-square, said probe being adapted to energize said first and second electrical circuits when applied to designated electrical contacts on said T-square, means to read-out from said storage means co-ordinate information responsive to the condition thereof, and reperforator means actuated by said read-out means for cutting a teletypewriter tape in accordance with said co-ordinate information.

4. In combination with a system for transmitting map co-ordinate information over telemetric communication facilities a semi-automatic co-ordinate overlay reader comprising a board having numbered reference markings thereon which correspond to the normal line spaces of a teletypewriter, a T-square having one edge numerically calibrated to the character spacings along a line of a standard teletypewriter, each of said numbers having an electrical circuit connected therewith, and an electrical probe, said probe being adapted to energize said electrical circuits by contact therewith.

5. A device for transmitting map co-ordinate data over telemetric communication facilities, comprising means for collecting co-ordinate data representing the various contour lines to be transmitted, means for identifying said contour lines, means for grouping said co-ordinate data according to values taken at equal horizontal increments of said map, means for sequentially storing and reading-out said data groups, means for perforating a first telemetric tape in response to said data groups, means for transmitting said taped co-ordinate data to a remotely located receiver, means for perforating a second telemetric tape at said receiver in response to the received co-ordinate data, and means for comparing the data on said second perforated tape with a pair of standard tapes to reproduce the original map co-ordinate information.

No references cited.